(12) United States Patent
Sikora et al.

(10) Patent No.: US 10,680,679 B2
(45) Date of Patent: *Jun. 9, 2020

(54) EXPANSION MODULES WITH SWITCHES AND EXTERNAL COMMUNICATION

(71) Applicant: Honeywell International Inc., Morris Plains, NJ (US)

(72) Inventors: Lubos Sikora, Brno (CZ); Ondrej Ficner, Bucovice (CZ); Ivo Chromy, Rajhrad (CZ)

(73) Assignee: Honeywell International Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/404,209

(22) Filed: May 6, 2019

(65) Prior Publication Data

US 2019/0260421 A1    Aug. 22, 2019

Related U.S. Application Data

(63) Continuation of application No. 15/485,208, filed on Apr. 11, 2017, now Pat. No. 10,326,497.

(51) Int. Cl.
*H04B 5/00* (2006.01)
*H04B 5/02* (2006.01)

(52) U.S. Cl.
CPC ......... *H04B 5/0037* (2013.01); *H04B 5/0056* (2013.01); *H04B 5/02* (2013.01)

(58) Field of Classification Search
CPC ....... H04B 5/0037; H04B 5/02; H01Q 1/2275
See application file for complete search history.

(56) References Cited

U.S. PATENT DOCUMENTS

| | | | |
|---|---|---|---|
| 7,983,795 | B2 | 7/2011 | Josephson et al. |
| 8,559,872 | B2 * | 10/2013 | Butler ................ G06K 19/0701 |
| | | | 455/41.1 |
| 8,708,242 | B2 | 4/2014 | Conner et al. |

(Continued)

FOREIGN PATENT DOCUMENTS

WO    2015131130 A1    9/2015

OTHER PUBLICATIONS

Bi et al., "Wireless Powered Communication: Opportunities and Challenges," IEEE Communications Magazine, pp. 117-125, Apr. 2015.

(Continued)

*Primary Examiner* — Lewis G West
(74) *Attorney, Agent, or Firm* — Seager, Tufte & Wickhem LLP (57) ABSTRACT

An external auxiliary switch mechanism having a base device and an expansion module. The base device may incorporate a transceiver and microcontroller connected to the transceiver. The expansion module may incorporate a transceiver and a microcontroller connected to the transceiver. The microcontroller of the expansion module may have a connection to one or more switches and/or a communication module connected to a network. Data may be transferred wirelessly between the transceiver of the base device and the transceiver of the expansion module with, for example, near-field communication techniques. In some versions of the present mechanism, the expansion module may derive power from signals from the basic device.

20 Claims, 7 Drawing Sheets

(56) References Cited

U.S. PATENT DOCUMENTS

| | | | |
|---|---|---|---|
| 9,124,358 | B2 | 9/2015 | Pahlavan et al. |
| 9,141,116 | B2 | 9/2015 | Deligiannis |
| 9,939,825 | B2* | 4/2018 | Alexander ............... G05F 1/10 |
| 2006/0220598 | A1* | 10/2006 | Argo ..................... B60S 1/481 318/16 |
| 2010/0293611 | A1* | 11/2010 | Ablabutyan ......... B60P 1/4471 726/17 |
| 2010/0302009 | A1* | 12/2010 | Hoeksel ................ G01D 21/00 340/10.1 |
| 2010/0308957 | A1* | 12/2010 | Finkenzeller ...... G07C 9/00309 340/3.9 |
| 2012/0181342 | A1 | 7/2012 | Richards-Fabian et al. |
| 2013/0217326 | A1* | 8/2013 | Symons ................. H02J 7/025 455/41.1 |
| 2014/0148095 | A1* | 5/2014 | Smith ..................... H04B 5/02 455/41.1 |
| 2015/0099464 | A1* | 4/2015 | Kiat ..................... H01H 71/00 455/41.1 |
| 2016/0188925 | A1* | 6/2016 | Liu ..................... G06K 19/073 340/10.34 |
| 2016/0282825 | A1 | 9/2016 | Kariguddaiah |
| 2016/0294446 | A1* | 10/2016 | Rumler .................. G05B 15/02 |
| 2016/0323825 | A1* | 11/2016 | Yamaji ..................... H04W 4/80 |
| 2017/0026779 | A1* | 1/2017 | Schmidlin ............... H04W 4/70 |
| 2017/0215261 | A1* | 7/2017 | Potucek ............... A61H 33/005 |
| 2017/0231738 | A1* | 8/2017 | Severson ................ A61F 2/004 600/31 |
| 2018/0034507 | A1* | 2/2018 | Wobak ................ H04B 5/0037 |
| 2018/0062453 | A1* | 3/2018 | Uehara ................... H02J 50/80 |
| 2018/0269560 | A1* | 9/2018 | Ding ................... H04B 5/0031 |

OTHER PUBLICATIONS

Energate, "AS20 Auxiliary Switch Installation Guide," 2 pages, downloaded Nov. 13, 2016.

Honeywell Inc., "201052A,B Auxiliary Switch," Installation Instructions, 2 pages, Oct. 1997.

Honeywell International Inc., "3 Nm, 5 Nm Series Spring Return Direct Coupled Actuators," Installation Instructions, 12 pages, Jun. 2015.

Honeywell International Inc., "SW2, SW-US Auxiliary Switch Kit for Smart Act Damper Actuators MNXX20, MNXX34, MSXX05, MSXX10, MSXX20," Installation Instructions, 2 pages, Feb. 2007.

* cited by examiner

EXPANSION MODULES WITH SWITCHES AND EXTERNAL COMMUNICATION

This application is a continuation of U.S. patent application Ser. No. 15/485,208, filed Apr. 11, 2017. U.S. patent application Ser. No. 15/485,208, filed Apr. 11, 2017, is hereby incorporated by reference.

BACKGROUND

The present disclosure pertains to auxiliary switches relative to actuators.

SUMMARY

The disclosure reveals an external auxiliary switch mechanism having a base device and an expansion module. The base device may incorporate a transceiver and microcontroller connected to the transceiver. The expansion module may incorporate a transceiver and a microcontroller connected to the transceiver. The microcontroller of the expansion module may have a connection to one or more switches and/or a communication module connected to a network. Data may be transferred wirelessly between the transceiver of the base device and the transceiver of the expansion module with, for example, near-field communication techniques. In some versions of the present mechanism, the expansion module may derive power from signals from the basic device.

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Aspects of the system or approach may be described in terms of symbols in the drawing. Symbols may have virtually any shape (e.g., a block) and may designate hardware, objects, components, activities, states, steps, procedures, and other items.

Auxiliary switches in field devices may be had by a small portion of applications. A product design should have this option that may impact product cost, size, and/or complexity. A standard option may have an external auxiliary switch. Such switch should be somehow connected to the product. This may again affect product design complexity, IP/NEMA rating and possibly also base product cost.

An external auxiliary switch which would not need to be physically coupled with the product would not necessarily affect the product IP/NEMA rating or its design complexity. A wirelessly communicating switch which would be also wirelessly powered from the device could work as an independent external module and be a solution for such situations.

The external module may contain the auxiliary switch or switches with a latching relay or relays and an antenna. The external module may also contain energy storage (e.g., a capacitor) for containing sufficient energy for several switch operations. The device may then contain a tuned antenna, e.g., a trace on a printed wiring board (PWB). Both the communication signals and the power for switching the relays may be transferred between the antennas over the small air gap and the plastic enclosure of the device and external expansion module. The device cost or design complexity may be then transferred to a not as often used and more expensive auxiliary switch module.

Figure 1:
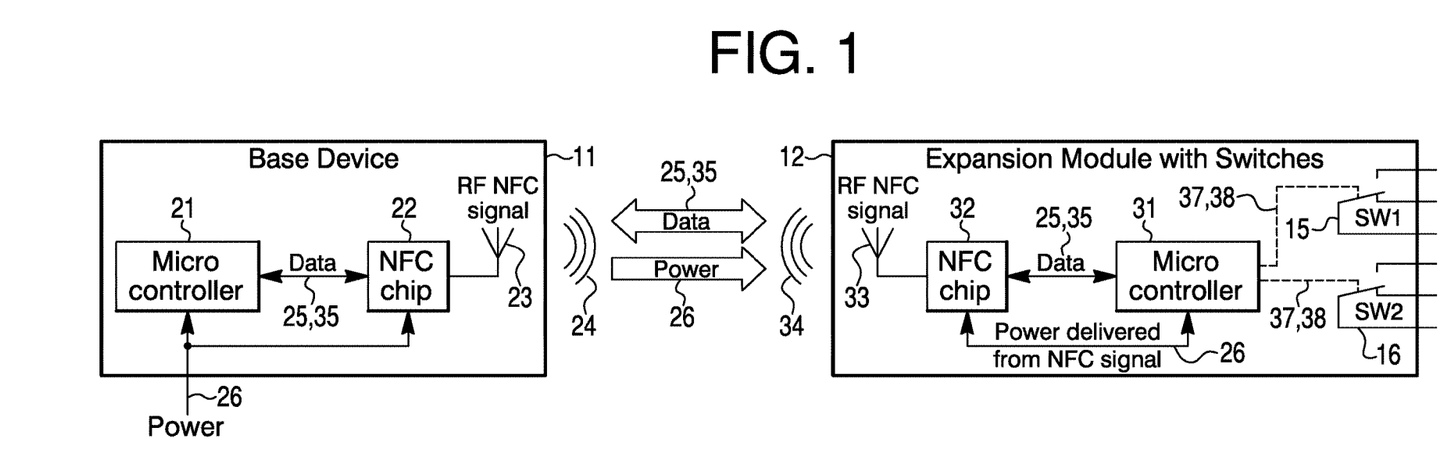
FIGS. 1 and 2 are diagrams containing the base device and several versions of expansion modules.
Figure 2:
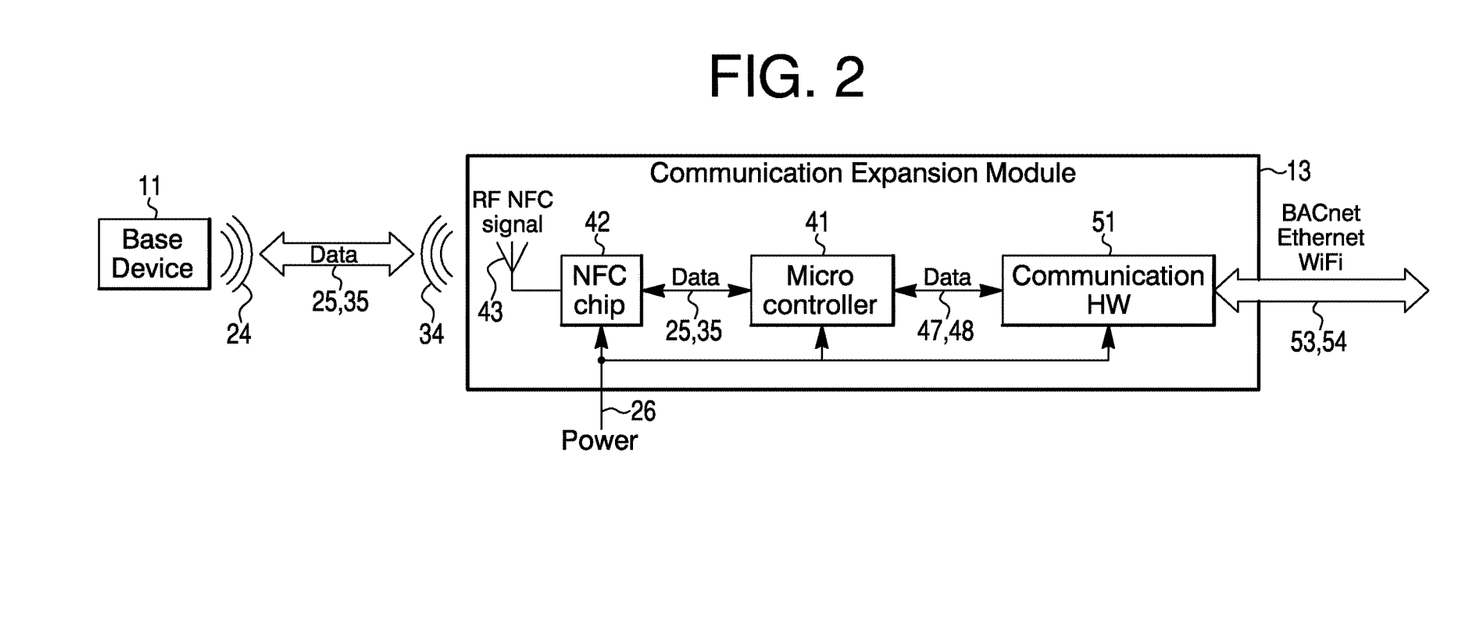

FIGS. 1 and 2 are diagrams containing the base device and several versions of expansion modules, respectively. The diagram of FIG. 1 shows a package with the external auxiliary switches which get switched on and off based on the actual position of the output hub of an actuator (i.e., the base device). The diagram of FIG. 2 showing another expansion module may be an example of what expansion module can be used (in communication between the base device and the outside world in this case). There are even more features which the expansion modules 12 and 13 may provide. Examples of such features may incorporate human interfaces (e.g., an LCD display or buttons), visual status indication of the base device 11, and other items that may be desired by many users and for special needs.

One may use, for example, a near-field communication (NFC) communicating expansion module that can be easily connected with a base device without a need to disassemble the base device.

There may be wireless communication and energy harvesting. The present approach may use very short range communication, i.e., generally 5 cm or less) and bring an expansion functionality of a device in the field without necessarily having to open the device.

The present disclosure may focus on external wirelessly communicating auxiliary switches. Various technologies and developing expansion modules may be used for much broader variety of additional things. Technologies may incorporate KNX, Canbus, Modbus, LON, BACnet, Bluetooth, Ethernet, Internet, Wi-Fi, Z-wave, and so on. In general, it may be a totally different function like analog feedback, HMI, and so forth.

FIG. 1 is a diagram of a base device 11 and two versions of expansion modules. A module 12 may have a package with an auxiliary switch 15 (SW1) and an auxiliary switch 16 (SW2). Switches 15 and 16 get switched on and off based on an actual position of an output hub of an actuator 17 in FIG. 3 (i.e., a base device in FIG. 2).

Switches 15 and 16 may be placed in module 12. Actuator 17 may measure an actual position of an output hub 20 and provide information about the position continuously to expansion module 12 via NFC communication. Actuator 17 may hold the information about the switching set points and provide the information to expansion module 12 as well. Logic of expansion module 12, such as that in the microcontroller 31, may then decide when to switch a switch (e.g., 15 or 16) on or off. This is a mechanism of how switches 15 and 16 may be associated with the output hub 20 position.

Another example of an expansion module may be module 13, which may be used for communication between actuator 17 and an outside world.

The present system and approach may use a wireless communication enabled inexpensive base device 11 that has features wanted by many customers and for special needs. One may use expansion modules 12 and 13 that can be easily connected with base device 11 without a need to disassemble base device 11.

Base device 11 may have a microcontroller 21 and an illustrative NFC (near-field communication) chip 22 connected to microcontroller 21 for conveying data between microcontroller 21 and NFC chip 22. An NFC antenna 23 may be connected to NFC chip 22. Antenna 23 may emanate RF NFC signals 24 that contain data 25 and power 26 to expansion module 12. External power may be provided to micro-controller 21 and NFC chip 22 of base device 11.

Expansion module 12 may have an NFC chip 32 that is connected to an antenna 33. RF NFC signals 24 emanated by antenna 23 of base device 11, may be received by antenna 33 and provided to NFC chip 32. Power 26 may be derived from the NFC signals 24. Data 25 may be derived from NFC signals 24. The derived power 26 may power the NFC chip 32 and micro controller 34. Data 25 may go to micro controller 31, which may be conveyed as processed data 37. Switches 15 and 16 may be get switched on and off by the position of output hub 20 of actuator 17. The positions of the switches may go as signals 38 to microcontroller 31 as signals processed into data 35 about positions of output hub 20. Data 35 may go from micro controller 31 to NFC chip for conversion into NFC signals 34 carrying data 36 to antenna 33, to be emanated, and to be received by antenna 23 and NFC chip 22. Data 35 may be extracted and provided to micro controller 21 for processing and/or storage.

FIG. 2 is a diagram of another expansion module 13. An antenna 43 may receive signals 34 conveying data 25. Signals 34 may go to an NFC chip 42 where data 25 are extracted from signals 34. Data 25 may be processed by a micro controller 41 into data 47. A communications interface module 51 may be sent data 47 out as signals 53 to the outside world via BACnet, Ethernet, Internet, Wi-Fi, KNX, Canbus, Modbus, LON, Bluetooth, Z-wave, or the like. Signals 53 may instead go to some other component. Signals 54 may be received by communications interface module 51. Data 48 may be extracted from signals 54 by module 51 and provided to micro controller 41. Data 48 may be processed into as data 35 that is provided to NFC chip 42. Data 35 may be put into a form of RF NFC signals 34 that is sent out from antenna 43 of expansion module 13. Signals 34 may be received by antenna 23 at base device 11. Data 35 may be extracted from signals 34 and provided to micro controller 21 for processing. Power 26 may be provided from a source to NFC chip 42, micro controller 41 and communications interface module 51 of communication expansion module 13.

Communication module 13 may work in the way that base device 11 (of actuator 17) provides data to communication module 13 (e.g., information about the actual position of the output hub 20, actual timing, name of the device, and so forth) or receives data from the communication module 13 (e.g., position over ride command, timing command, and so on) via NFC communication. Communication module 13 may translate this data into an appropriate form and protocol based on which type of communication with the outside world is desired or needed (e.g., BACnet, Ethernet, Internet, Wi-Fi, KNX, Canbus, Modbus, LON, Bluetooth, Z-wave, or the like).

Figure 3:
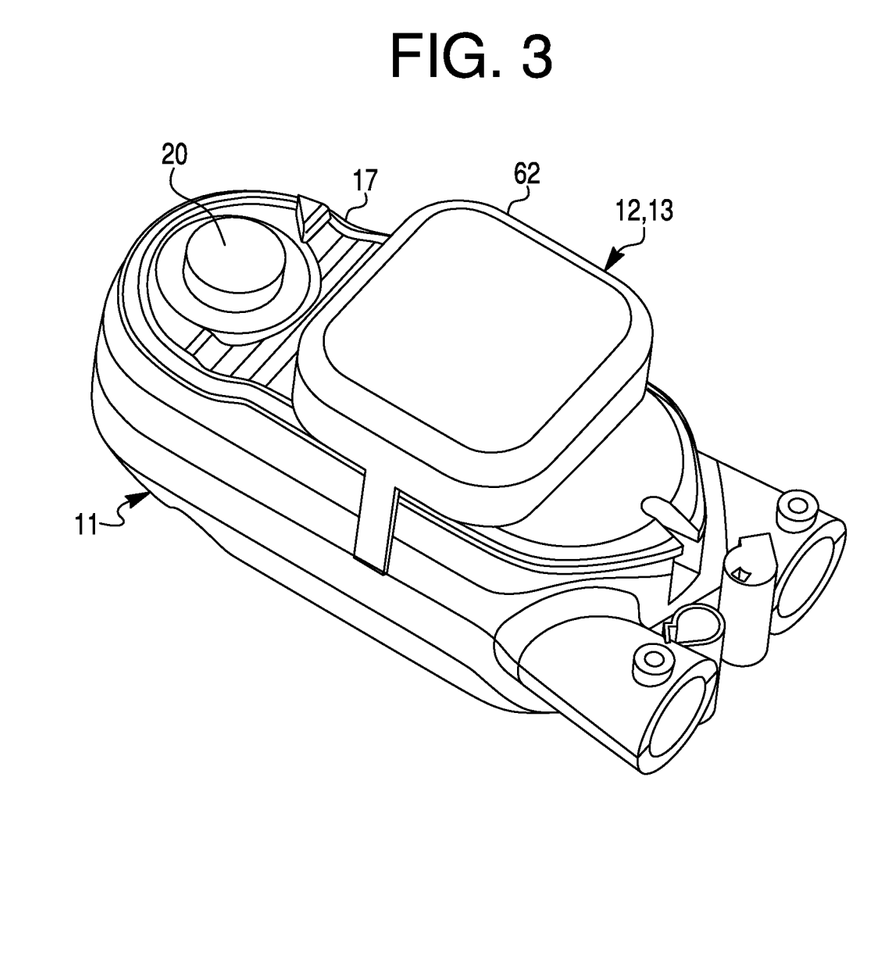
FIG. 3 is a diagram of an actuator containing electronics of base device, and an adjunct component containing electronics of an expansion module or of communication expansion module 13.

FIG. 3 is a diagram of an actuator 17 containing electronics of base device 11, and an adjunct component 62 containing items of an expansion module 12 or of communication expansion module 13.

Figure 4:
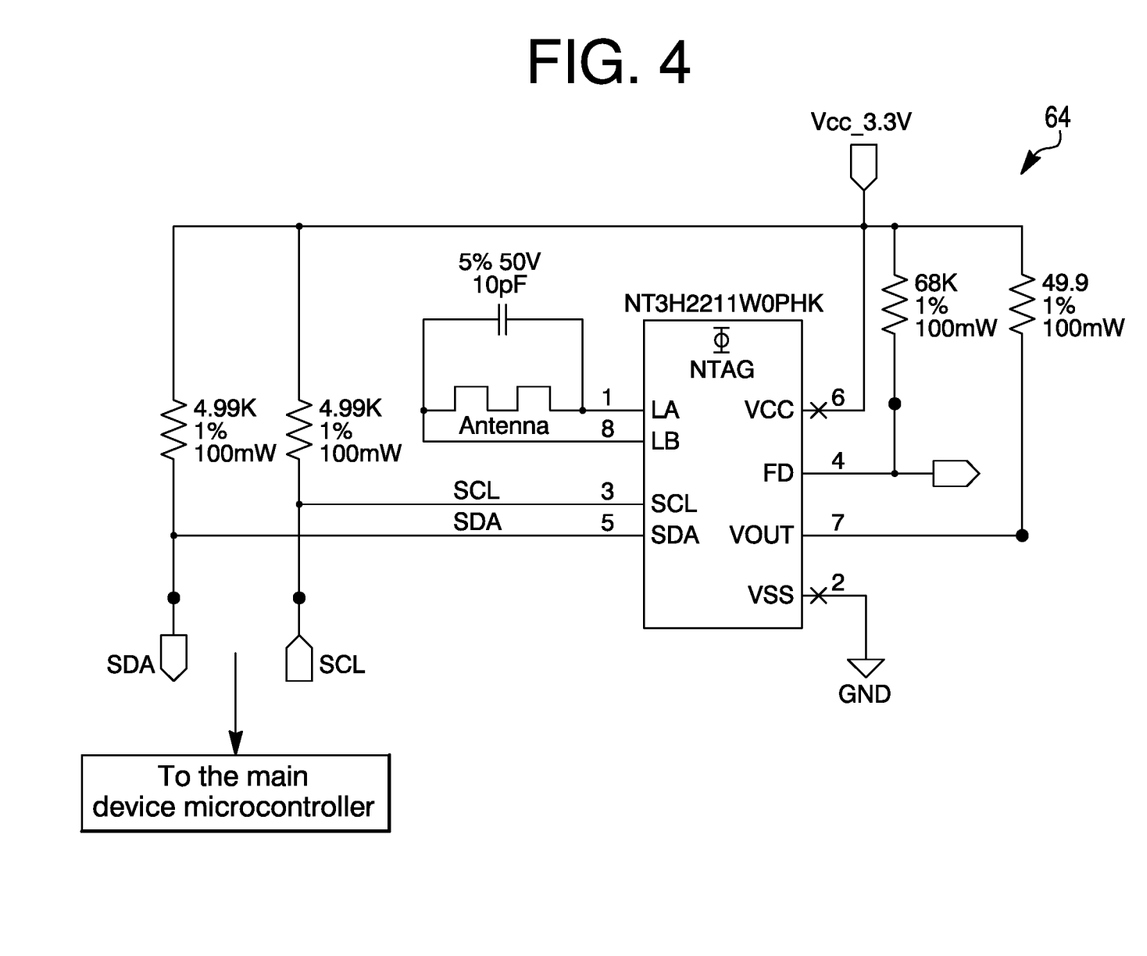
FIG. 4 is a schematic of example circuitry that may be used for a base device, expansion module, and a communication expansion module when acting as a tag (slave) device.
Figure 5A:
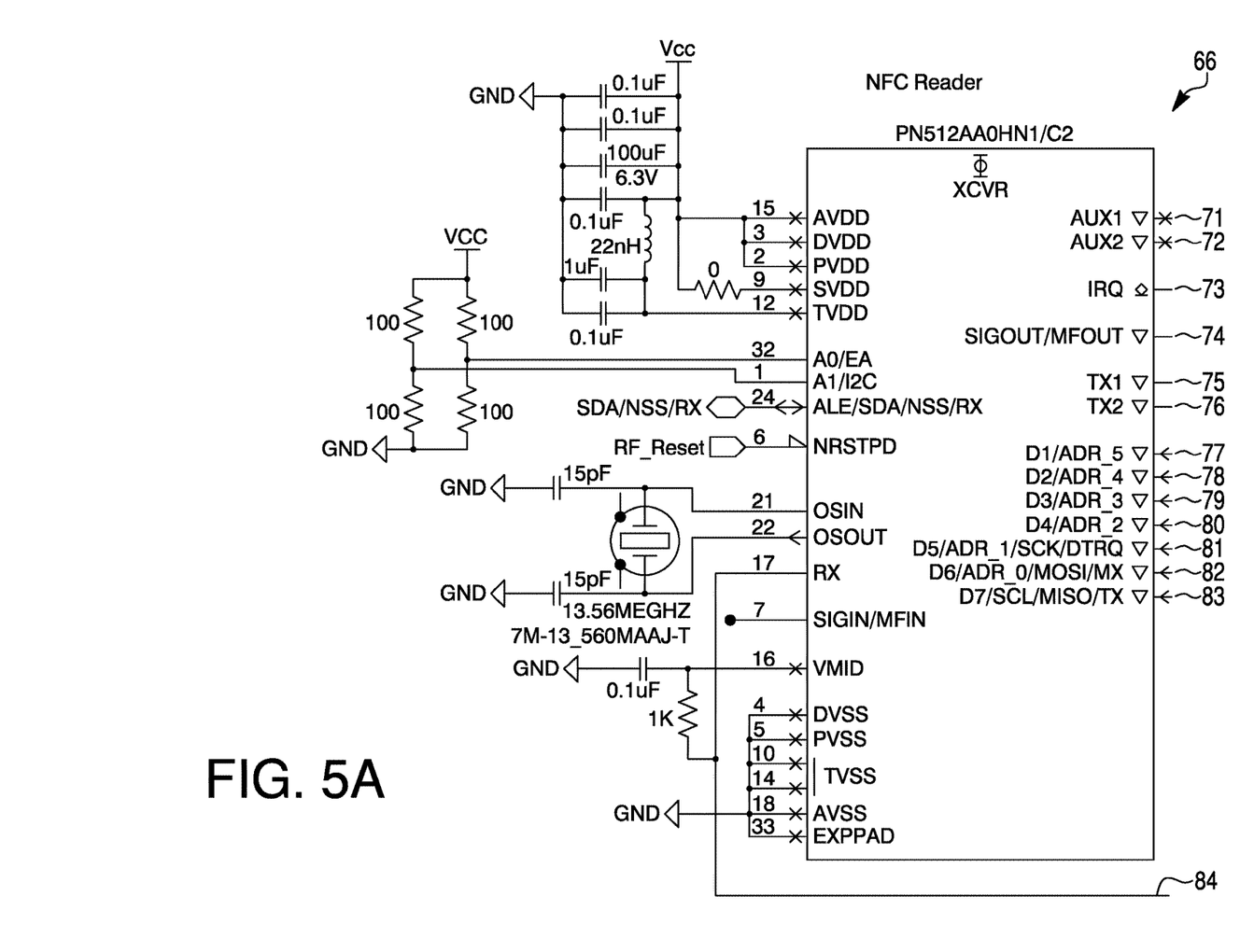
FIG. 5a and FIG. 5b are portions of a near-field communication circuit that may be used for a base device, expansion module, and a communication expansion module when acting as a reader (master) device.
Figure 5B:
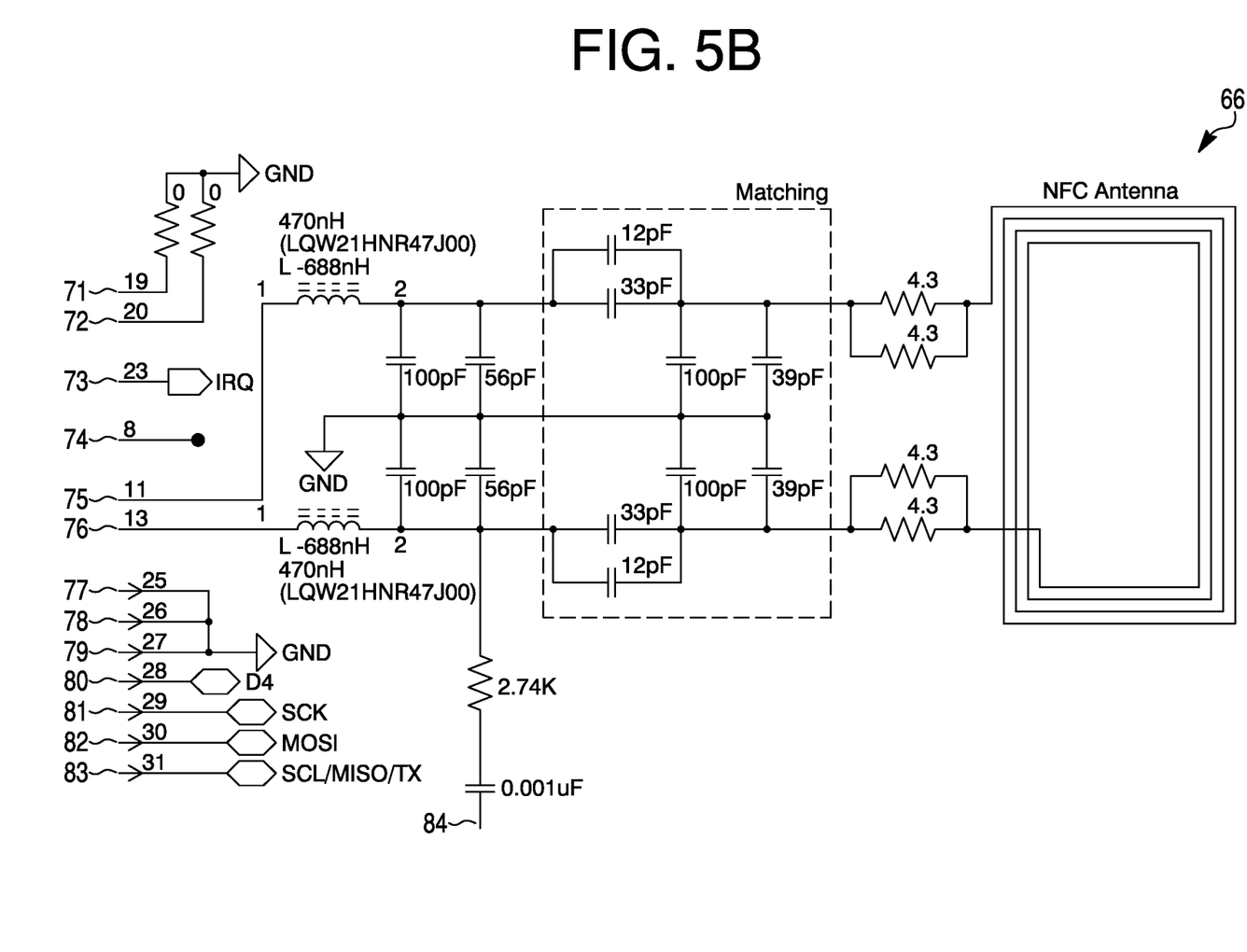

FIG. 4 is a schematic of example circuitry 64 that may be in an NFC chip 11. FIG. 4 is a schematic of example circuitry 64 that may be used for a base device 11, expansion module 12, and a communication expansion module 13 when acting as a tag (slave) device;

FIG. 5a and FIG. 5b are portions of a near-field communication circuit 66 that may be used for a base device 11, expansion module 12, and a communication expansion module 13 when acting as a reader (master) device. Common lines between the portions of circuit 66 may be indicated by numerical designations 71, 72, 73, 74, 75, 76, 77, 78, 79, 80, 81, 82, 83 and 84.

Figure 6A:
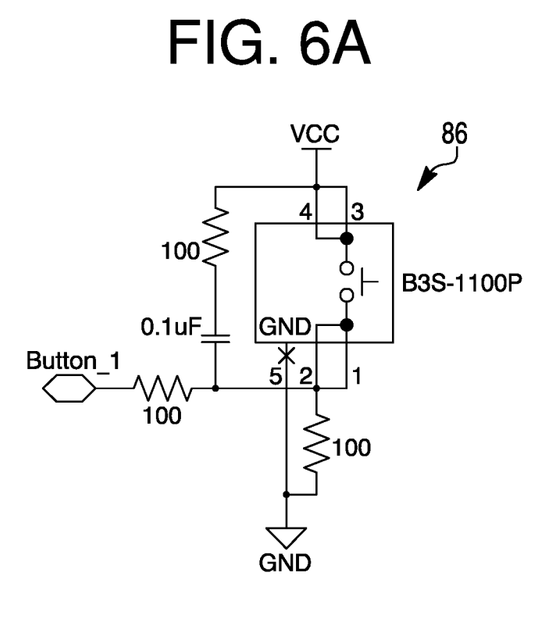
FIGS. 6a and 6b are schematics of buttons that may be integrated with the near-field communication circuit.
Figure 6B:
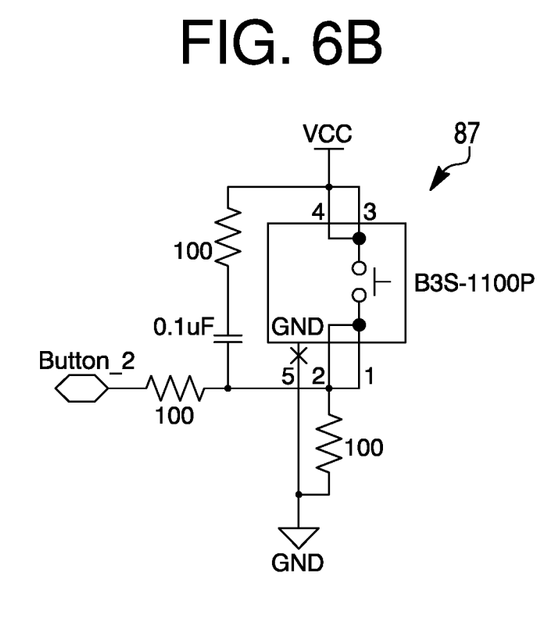
Figure 7A:
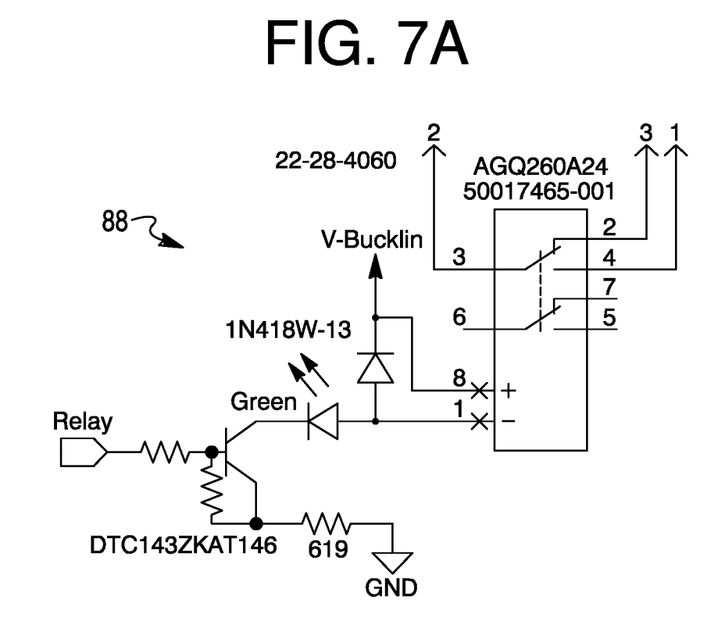
FIGS. 7a and 7b are schematics of switches that may be integrated with the near-field communication circuit.
Figure 7B:
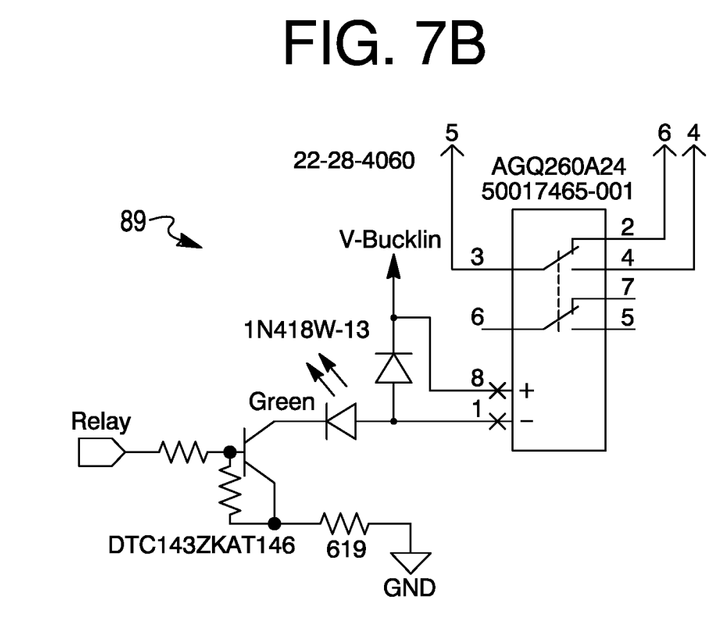

FIGS. 6a and 6b are circuit schematics 86 and 87, respectively, of buttons that may be integrated with circuit 66. FIGS. 7a and 7b are circuit schematics 88 and 89, respectively, of switches that may be integrated with circuit 66. The buttons and switches may provide some user interface with base device 11.

To recap, an external auxiliary switch mechanism may incorporate a base device, and an expansion module. The base device may incorporate a transceiver, and a microcontroller connected to the transceiver. The expansion module may incorporate a transceiver, and a microcontroller connected to the transceiver. The microcontroller of the expansion module may have a connection to one or more switches. Data may be transferred wirelessly between the transceiver of the base device and the transceiver of the expansion module.

The expansion module may derive power from signals from the basic device to the expansion module. Some of the power may be saved in a storage capacitor. Some of the power may be provided to the transceiver and microcontroller of the expansion module.

The transceiver of the base device may incorporate a near-field communication circuit. The transceiver of the expansion module may incorporate a near field communication circuit.

The near field communication, microcontroller and communication hardware of the expansion module may have a connection for a power supply.

Communication hardware may be connected to the microcontroller of the expansion module and to a network.

The network may be selected from a group incorporating BACnet, Ethernet, Internet, Wi-Fi, Modbus, LON, Bluetooth, KNX, Canbus, and Z-wave.

An auxiliary switch system may incorporate an actuator having a base device, and an expansion module with a connection to the base device. The expansion module may incorporate a connection to one or more auxiliary switches that are switched on or off based on a position of an output hub of the actuator. The connection between the base device and the expansion module may be wireless.

The connection between the base device and the expansion module may incorporate a first near-field communication transmitter and receiver at the base device, a second near-field communication transmitter and receiver at the expansion module, and signals transmitted and received between the first near field communication transmitter and receiver and the second near-field communication transmitter and receiver may incorporate data and power.

A range of the wireless connection may be five centimeters or less.

Power harvested from the signals may be stored in a capacitor.

The expansion module may be connected to a network selected from a group incorporating BACnet, Ethernet, Wi-Fi, Internet, Modbus, LON, Bluetooth, KNX, Canbus, and Z-wave.

The expansion module may be connected to or disconnected from the base device in absence of disassembling the base device.

An actuator support arrangement may incorporate an actuator with a base device, and an expansion module having a wireless connection to the base device. The wireless connection may be a near-field communication (NFC) connection. The expansion module may incorporate one or more auxiliary switches.

The base device may incorporate a micro controller connected to a power connection, an NFC integrated circuit (IC) connected to the micro controller, and an antenna connected to the NFC IC.

The expansion module may incorporate a micro controller, an NFC IC connected to the microcontroller, and an antenna connected to the NFC IC. Power may be derived from NFC signals to the antenna by the NFC IC. The power may be provided for the NFC IC and the micro controller.

Data signals may be transmitted from the base device to the expansion module. Data signals may be transmitted from the expansion module to the base device.

Power may be harnessed at the expansion submodule from signals transmitted from the base device to the expansion module.

The expansion module may incorporate a micro controller, a NFC IC connected to the micro controller, an antenna connected to the NFC IC, and a communication interface submodule connected to the microcontroller.

The communication interface submodule of the expansion module may have a connection to one or more items of a group having an Ethernet, Internet, BACnet, Wi-Fi, Modbus, LON, Bluetooth, KNX, Canbus, and Z-wave.

The communication interface submodule may incorporate a connection to one or more items of a group incorporating a display, keyboard, buttons, switches, indicators, and mouse.

The NFC IC, microcontroller and the communication interface submodule of the expansion module may have connections for a power source.

Any publication or patent document noted herein is hereby incorporated by reference to the same extent as if each publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A field device comprising:
   a first enclosure to store a base device, the base device comprising:
      an output hub having a first actual position and a second actual position,
      wherein the base device is designed to measure an actual position of the output hub;
      a first transceiver; and
      a first microcontroller operatively coupled to the first transceiver and configured to receive power from a source external of the base device; and
   a second enclosure to store an expansion module, the expansion module comprising:
      one or more switches;
      a second transceiver configured to exchange data wirelessly with the first transceiver of the base device, wherein the data includes the actual position of the output hub; and
      a second microcontroller operatively coupled to the second transceiver and the one or more switches and configured to switch the one or more switches on or off based on the actual position of the output hub of the base device.

2. The field device of claim 1, wherein some of the power from the source external of the base device is saved in a storage capacitor and some of the power from the source external of the base device is provided to the second transceiver and the second microcontroller of the expansion module.

3. The field device of claim 1, wherein the first transceiver of the base device comprises a near-field communication circuit and the second transceiver of the expansion module comprises a near field communication circuit.

4. The field device of claim 3, wherein the near field communication circuit and the second microcontroller of the expansion module have a connection for communication hardware and a connection for a power supply.

5. The field device of claim 4, wherein the communication hardware is connected to a network.

6. The field device of claim 5, wherein the network is selected from a group comprising BACnet, Ethernet, Internet, Wi-Fi, Modbus, LON, Bluetooth, KNX, Canbus, and Z-wave.

7. A field device comprising:
   a first enclosure to store an actuator comprising a base device, the base device including a first microcontroller configured to receive power from a source external of the base device; and
   a second enclosure to store an expansion module having:
      a connection to one or more auxiliary switches that are switched on or off based on an actual position of an output hub of the actuator; and
      a wireless connection to the base device configured to transmit signals to the expansion module, wherein the signals transmitted include at least the actual position of the output hub.

8. The field device of claim 7, wherein the wireless connection between the base device and the expansion module comprises:
   a first near-field communication transmitter and receiver at the base device;
   a second near-field communication transmitter and receiver at the expansion module; and
   the signals transmitted and received between the first near field communication transmitter and receiver and the second near-field communication transmitter and receiver comprise data and power.

9. The field device of claim 8, wherein a range of the wireless connection is five centimeters or less.

10. The field device of claim 8, wherein power harvested from the signals is also stored in a capacitor.

11. The field device of claim 8, wherein the expansion module is connected to a network selected from a group comprising BACnet, Ethernet, Wi-Fi, Internet, Modbus, LON, Bluetooth, KNX, Canbus, and Z-wave.

12. The field device of claim 7, wherein the expansion module can be connected to or disconnected from the base device in absence of disassembling the base device.

13. A field device comprising:
    a first enclosure to store an actuator that includes an output hub and a microcontroller configured to receive power from a source external of the first enclosure; and
    a second enclosure to store an expansion module having:
        a near-field connection (NFC) to the first enclosure configured to transmit signals that include at least an actual position of the output hub; and
        one or more auxiliary switches that are switched on or off based on the actual position of the output hub.

14. The field device of claim 13, wherein the first enclosure comprises:
    a power connection connected to the microcontroller;
    an NFC integrated circuit (IC) connected to the microcontroller; and
    an antenna connected to the NFC IC.

15. The field device of claim 13, wherein the expansion module comprises:
    a microcontroller;
    an NFC IC connected to the microcontroller; and
    an antenna connected to the NFC IC; and
    wherein:
    power is derived from NFC signals to the antenna by the NFC IC; and
    the power is provided for the NFC IC and the microcontroller.

16. The field device of claim 13, wherein:
    data signals are transmitted from the first enclosure to the expansion module; and
    data signals are transmitted from the expansion module to the first enclosure.

17. The field device of claim 13, wherein power is harnessed at an expansion submodule from signals transmitted from the first enclosure to the expansion module.

18. The field device of claim 13, wherein the expansion module comprises:
    a microcontroller;
    a NFC IC connected to the microcontroller;
    an antenna connected to the NFC IC; and
    a communication interface submodule connected to the microcontroller.

19. The field device of claim 18, wherein the communication interface submodule of the expansion module has a connection to one or more items of a group comprising an Ethernet, Internet, BACnet, Wi-Fi, Modbus, LON, Bluetooth, KNX, Canbus, and Z-wave.

20. The field device of claim 18, wherein the communication interface submodule comprises a connection to one or more items of a group comprising a display, keyboard, buttons, switches, indicators, and a mouse.

* * * * *